Feb. 12, 1946.　　　　E. R. MORTON　　　　2,394,559
SPEED CONTROL FOR MOTOR
Filed June 28, 1941
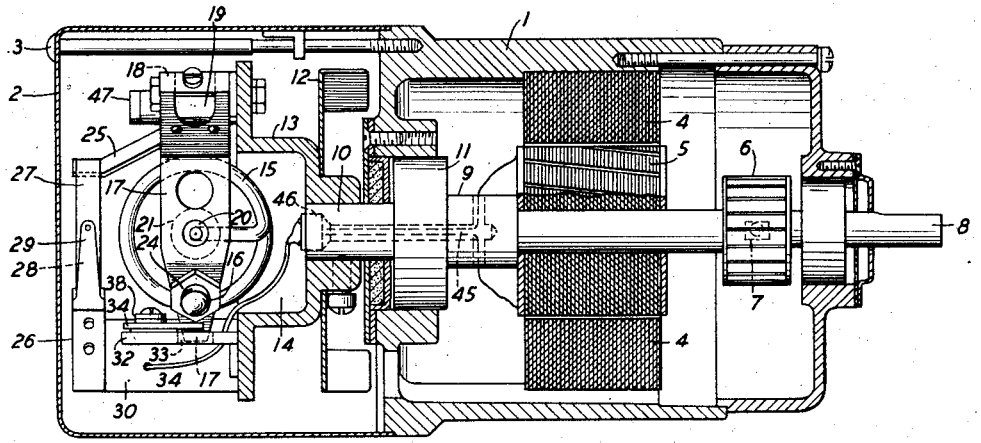
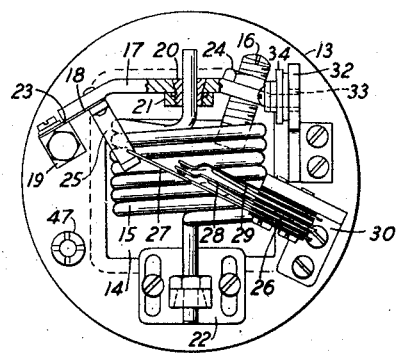
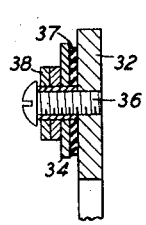
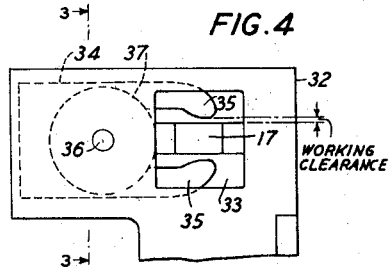
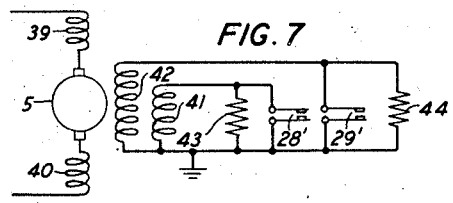
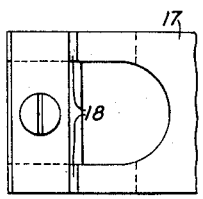
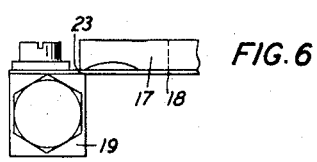
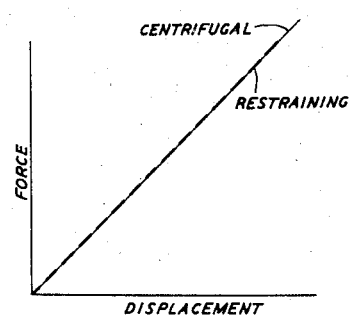
INVENTOR
E. R. MORTON
BY
ATTORNEY Patented Feb. 12, 1946

2,394,559

UNITED STATES PATENT OFFICE 2,394,559

SPEED CONTROL FOR MOTORS

Edmund R. Morton, Brooklyn, N. Y., assignor to Bell Telephone Laboratories, Incorporated, New York, N. Y., a corporation of New York Application June 28, 1941, Serial No. 400,299

7 Claims. (Cl. 200—80)

The present invention relates to speed control of a dynamo-electric machine and has for its object the maintenance of substantially constant speed of, for example, an electric motor under varying operating conditions.

The embodiment of the invention to be specifically disclosed herein was developed in response to a need for a small motor that would have good starting torque and that would run at constant high speed under such adverse conditions as variable load, variable voltage supply, variable temperature and when subjected to vibration. A further requirement was small weight and space together with simple and rugged construction.

In its general features, the embodiment to be more specifically disclosed hereinafter comprises a series wound motor with a mechanical governor controlling contacts which open and close as the governor arm vibrates in response to variations from normal speed. These contacts open and close circuits through braking windings on the motor armature, thereby varying the load on the motor. The embodiment to be disclosed contains certain features, provided in accordance with the invention, which together result in a reliability and degree of precision believed to be distinctly new in the art, as will be more fully pointed out.

The nature of the invention and its objects and features will appear more fully from the following detail description and from the accompanying drawing, in which:

Fig. 1 is a longitudinal view, partly sectional, of the assembly of the motor and governor, according to the invention;

Fig. 2 is a view in elevation of the governor as seen from the left in Fig. 1 when the cover plate is removed;

Figs. 3, 4, 5 and 6 are details;

Fig. 7 is a circuit diagram of the motor and braking windings with their control contacts; and Fig. 8 is a curve showing relations to be referred to in the description.

In Fig. 1 the motor housing is shown at 1 and the cover for the governor is at 2 with screws 3 for securing the cover to the motor housing. The two poles are shown at 4, armature at 5, commutator at 6 and the position of one of the two opposite brushes is shown at 7, these being in a line at right angles to the center line of the poles. The motor shaft 8 is enlarged at 9 and 10 for extra strength and is provided with a rugged ball bearing 11. The projecting end 10 of the shaft carries a fan 12 and a face plate or rotating head 13 which supports the governor. Face plate 13 has a rectangular recess 14 seen also in Fig. 2 for accommodating the coil spring 15 of the governor.

The governor proper comprises a weight 16, in the form of an adjustable screw, carried on an arm 17 which is hinged by a reed 18 to the post 19 on the face plate 13, and a restraining coil spring 15 for the arm 17. The upper end of spring 15 passes through the arm 17 and has a collet 20 in a tapered hole in arm 17 so that as the collet is drawn down by nut 21 it grips the end of the spring securely against the arm 17. The opposite end of spring 15 is similarly secured in a bracket 22 provided with slots so that it may be moved for adjusting the spring tension. The governor weight 16 in the form of a screw is set at an angle to permit accurate adjustment of the radial distance of the center of mass of the governor arm and weight from the shaft center. The adjustment is held, when once made, by lock nut 24.

In order to relieve the steel spring, or reed, 18 from too severe bending strains at the hinge point, the arm 17 has its middle portion cut away at the end as shown in Fig. 5, which is a partial plan view looking down upon the bent end of the arm in Fig. 2, and the under side of this end of the arm is grooved as shown in Figs. 5 and 6.

The governor arm 17 has a lever arm 25 for operating the spring pile-up 26 comprising the relatively long spring 27 and the short springs 28, 29. The spring pile-up is mounted on bracket 30 on face plate 13. The lever arm 25 has a bent end reaching underneath the free end of spring 27 so that as the governor arm is thrown outwardly by centrifugal force against the tension of spring 15 the contact springs 27, 28 and 28, 29 are closed in succession.

The free end of arm 17 is bent back to horizontal (as seen in Fig. 2) and passes through an aperture 33 in bracket 32 secured on face plate 13. Excessive motion of the free end of the arm 17 is prevented by the damping member 34 which has fingers 35 reaching over arm 17 in position to be engaged by the arm when its movement exceeds a predetermined amount. Damping plate 34 is of aluminum and rotates around pin 36 which has a friction washer such as fiber washer 37 which together with plate 34 is loosely mounted between washers 38 and the face of bracket 32 to apply a controlled amount of friction to the plate 34 when the assembly rotates. Further description of the action of this mechanical damping feature will be given at a later point.

It is thought that the general operation of the mechanical features of the governor will be evident from the above description. It will be clear that governor arm 17 is moved outwardly by centrifugal force against the tension of the restraining spring 15 as the motor speeds up and that contact springs 27, 28 and 29 are separated until normal speed is attained and slightly exceeded whereupon lever arm 25 in engagement with spring 27 closes first contact springs 27 and 28 and then, with further movement, springs 28 and 29. The circuits closed in this way, to be described presently, load the armature sufficiently to slow the motor down until the springs are separated, and in practice the springs are continually opening and closing to maintain substantially constant speed.

The braking windings controlled by the contact springs are shown in Fig. 7 at 41 and 42. The field coils are shown at 39 and 40 and the armature at 5. The normal armature windings are not shown. When contact 28' (representing the contact between springs 27 and 28) is closed it short-circuits resistance 43 normally in series with winding 41. When contact 29' (representing the contact made by springs 28 and 29) is closed it short-circuits the resistance 44 normally in series with winding 42.

One end of each of these two parallel wires is grounded on the shaft and the other ends are pulled through the bore in the shaft shown at 45 in Fig. 1 and brought out to connecting block 46 from which they are carried across to the contact springs and resistances 43, 44 on revolving head 13. For a further disclosure as to the braking windings, reference may be made to the copending application of H. M. Stoller, Serial No. 400,247, filed June 28, 1941.

It is seen that as the motor speed increases the contact 28' which closes first operates on a 31-ohm resistance winding (41) while the contact (29') which closes later operates on a 19-ohm winding (42).

In this manner the sparking is minimized since the heavier current winding is broken only when the associated higher resistance winding is short-circuited. Thus, what would normally constitute an inductive discharge at the contact points is absorbed by the closely coupled closed circuit. The short-circuiting of the secondary armature windings causes electrical losses in these windings, thereby throwing a load on the motor and causing the speed to fall. The restraining spring then overcomes the centrifugal force and causes the contacts to be opened after which the sequence is repeated. The frequency of this vibration in one case was approximately 30 cycles per second. This frequency is entirely independent of the rotation frequency of the motor and out of synchronism with it so that closure of the contacts may occur at any point in the cycle of the electromotive force induced in the secondary armature windings 41 and 42. The resistances are mounted in suitable position on the head 13, as shown at 47.

The spring 15 should be made of an alloy having a substantially zero temperature coefficient of elasticity where the motor is to operate under varying temperature conditions. In the motor referred to, constructed and successfully used, the governor held the speed within ±2 revolutions per minute in the case of a 3600 R. P. M. motor. This regulation was maintained under varying load conditions at constant voltage or under voltages from 20 to 28 volts at constant load. The governor gave substantially constant speed control over a temperature range —50° F. to +160° F.

Among the factors which enable this degree of constancy of speed under varying conditions the following are regarded as particularly important:

(1) Means for accurately matching the spring build-up characteristic with the centrifugal force characteristic of the governor weight;

(2) Substantially free vibration of the governor arm with negligible load; and (3) The mechanical damping to obtain stability of governing.

In the case of the first factor the spring build-up characteristic is the composite effect of the main spring 15, the reed 18 and the contact pile-ups 27, 28 and 29, as well as the initial tension to which the spring 15 is adjusted. If the governor arm 17 is pulled out, the force versus deflection may be plotted and will follow a straight line of a certain slope as indicated by the dash line in Fig. 8, this line following Hook's law. It is necessary that the characteristic plotted between centrifugal force of the weight and the corresponding deflection should have an identical slope in order that the speed at which governing action occurs shall be substantially constant over the working range of deflection of the governor arm. This is accomplished by shaping the governor weight and locating its center of mass at a radius such that the desired slope is secured. This characteristic is shown by the solid line on Fig. 8 and is seen to coincide with the characteristic of total force versus deflection of the spring. Adjustability is provided for both the weight and the spring tension, the former being the threaded weight 16 set at an angle and the latter being the adjustability of the tail-piece 22 for the lower end of spring 15.

As regards the second factor, it is essential that the mechanical friction involved in operating the contact springs should be negligible. Otherwise the precision of regulation would be spoiled by "mechanical hysteresis." Loading of the governor in this disclosure is minimized by locating in a straight line the hinge point 23 of the governor arm, the bearing of the lever 25 against spring 27 and the stationary ends 26 of the contact springs. By this means the motion between the lever arm 25 and the spring pile-up is a simple rocking motion without mechanical sliding.

Regarding the third factor, it is a property of all precise governors that they tend to hunt or oscillate over a range from one extreme position to another unless checked by suitable damping means. In this disclosure the damping means already described comprising plate 34 and damping washer 37 permit the governor arm 17 complete freedom of motion without friction within the limits of motion necessary to actuate the contacts 28' and 29' but provide friction on either side of this desired range. The damping range may be controlled by the separation of the fingers 35. Pressure against the fiber washer is caused by centrifugal force which assures a constant uniform pressure. Advantages of this method of damping are its cheapness and freedom from temperature effects.

What is claimed is:

1. In a motor governor, a spring-restrained normally open contact adapted to be closed and opened for controlling the motor speed, a rotary governor operating by centrifugal force against spring action to open and close said contact in response to speed fluctuations, said governor comprising a weighted arm rocking over a fulcrum, said arm engaging and actuating said contact spring, the latter having flexure about a fixed point, said weighted arm having such distribution of mass and its center of mass at such radius from the fulcrum as to make the centrifugal force versus deflection characteristic of the governor coincide with the force versus deflection characteristic of the total restraining spring action including that of the contact, throughout the regulation range.

2. The subject-matter of claim 1, in which said fulcrum, said fixed point and the point of engagement between said arm and said contact spring lie substantially in the same straight line.

3. The subject-matter of claim 1, in which a mechanical damping means is provided for damping the oscillations of said governor arm when amplitude of said oscillations exceeds a predetermined amount comprising a lever mounted to be oscillated by said arm, and means to apply friction to the lever by centrifugal force as the motor runs.

4. In a governor for a dynamo-electric machine, said governor having an oscillating arm mounted on a rotating head, a contact to be opened and closed by said governor arm to regulate the speed of said machine, and a damping member mounted on said rotating head and having fingers extending on either side of said arm and providing clearance for free vibration of said arm within an operating range, said member damping vibrations of the arm exceeding in amplitude said operating range.

5. The combination according to claim 4 including a flat surface on said damping member in frictional engagement with a flat surface in fixed relation to said rotating head, and means to apply pressure between said surfaces by centrifugal force produced by rotation of the machine.

6. In a governor for a dynamo-electric machine, an arm mounted on a rotating part and adapted for vibration, said arm being thrown outward by centrifugal force against a restraining spring, contacts positioned to be opened and closed by movement of said arm and in turn regulating the speed of said machine, said contacts mounted on the free ends of leaf springs fixedly secured to each other at their opposite end and to said rotating part, said arm mechanically engaging the free end of one of said springs whereby the electrical contact takes place between resiliently yielding parts, and means to damp vibrations of said arm in excess of the extent of movement required to open and close said contacts, said last means allowing a working clearance sufficient to permit said contacts to operate before the damping takes effect.

7. In a governor for a dynamo-electric machine, a rotating part, a vibratable governor arm mounted on said rotating part to be thrown outward by centrifugal force, a restraining spring therefor, contacts positioned to be opened and closed by movements of said arm for regulating the speed of the machine, a reed for securing the fixed end of said arm to said rotating part, said reed extending over the outward side of a fixed post on said rotating part and under the inward side of said arm, and means to relieve strain on said reed when the arm is vibrating comprising cut-away portions on the inward side of said arm close to the fixed end thereof.

EDMUND R. MORTON.